United States Patent
Finn et al.

[19]

[11] Patent Number: 5,940,002

[45] Date of Patent: Aug. 17, 1999

[54] SECURITY SYSTEM WITH RANDOM NUMBER REMOTE COMMUNICATION

[75] Inventors: Alan M. Finn, Amston, Conn.; Philip J. Koopman, Jr., Pittsburgh, Pa.; Roger D. Carroll, Burnsville, Minn.

[73] Assignee: UT Automotive Dearborn, Inc., Dearborn, Mich.

[21] Appl. No.: 08/948,743

[22] Filed: Oct. 10, 1997

[51] Int. Cl.⁶ .............................. G08C 19/00; H04L 9/00
[52] U.S. Cl. .................... 340/825.31; 340/825.69; 340/825.72; 340/825.34; 380/42; 380/43; 380/44
[58] Field of Search ..................... 340/825.31, 825.34, 340/825.69, 825.72; 180/287; 307/10.2; 380/42–46

[56] References Cited

U.S. PATENT DOCUMENTS

| | | | |
|---|---|---|---|
| 5,109,221 | 4/1992 | Lambropoulos et al. | 340/825.69 |
| 5,412,379 | 5/1995 | Waraksa et al. | 340/825.72 |
| 5,696,828 | 12/1997 | Koopman, Jr. | 380/46 |

*Primary Examiner*—William A. Cuchlinski, Jr.
*Assistant Examiner*—Yonel Beaulieu
*Attorney, Agent, or Firm*—Howard & Howard

[57] ABSTRACT

A security system that is useful for protecting vehicles from theft and buildings from unauthorized entry, for example, includes utilizing random numbers within remotely transmitted signals. A remote signaling device transmits a signal to a system controller with instructions for a desired operation of the system. The invention prevents a potential thief from capturing one or more transmitted signals and later mimicking or predicting a subsequent signal by including or utilizing a random number when generating the transmitted signal. The random number is incorporated into the transmitted signal in one of several ways according to this invention. Single-use or limited re-use of random numbers enhances the security and integrity of the system.

18 Claims, 1 Drawing Sheet

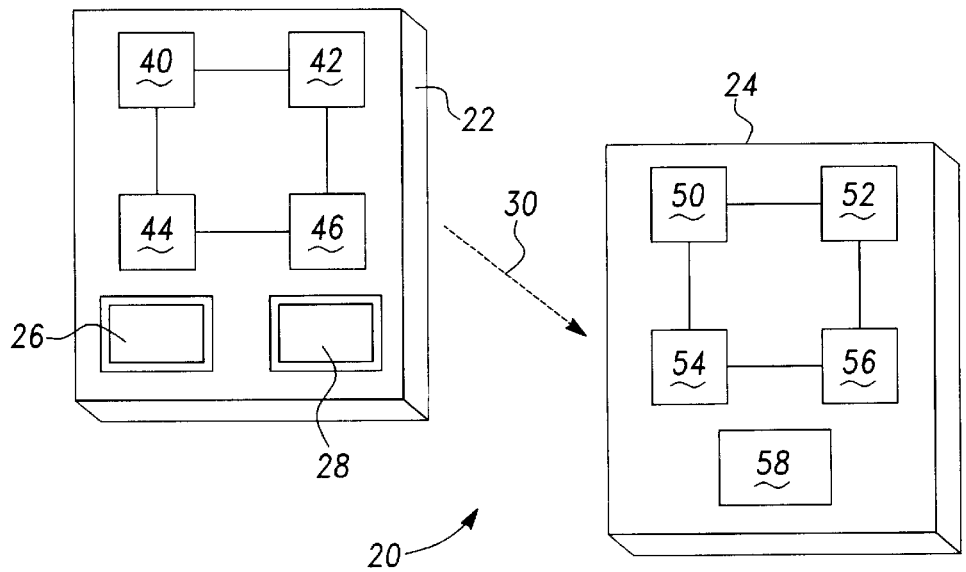
*Fig-1*
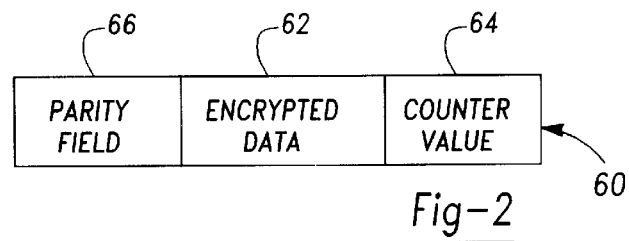
*Fig-2*
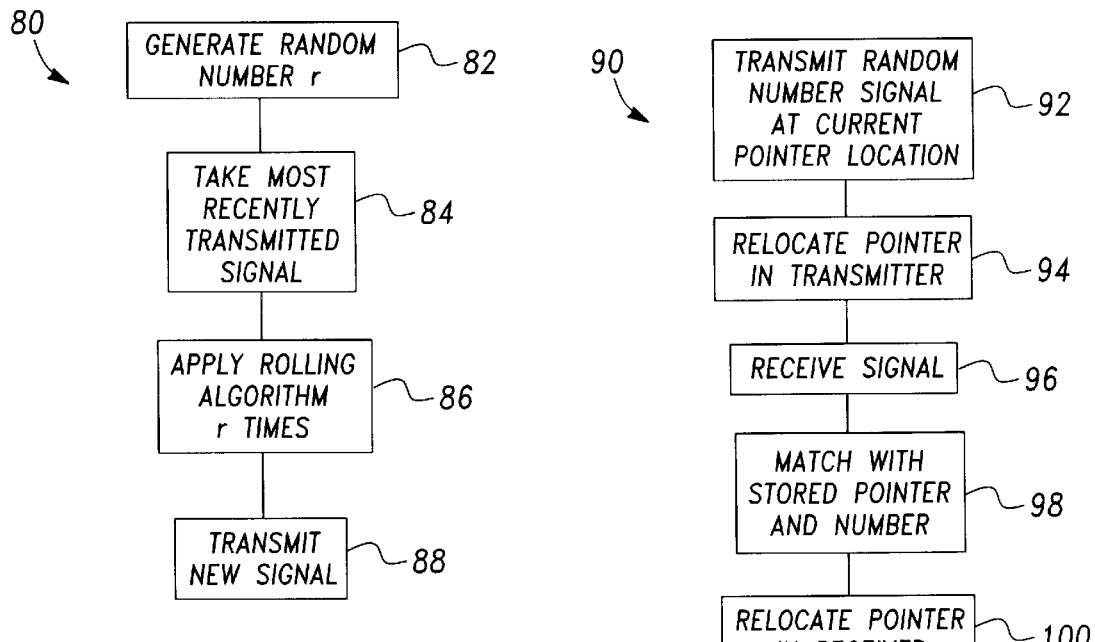
*Fig-3*
*Fig-4*

SECURITY SYSTEM WITH RANDOM NUMBER REMOTE COMMUNICATION

BACKGROUND OF THE INVENTION

This invention generally relates to security systems where a remote signaling device is used to communicate with a system controller. More specifically, this invention relates to security systems that incorporate random numbers into remote signals, which enhances the integrity and security of the system.

Security systems for protecting vehicles from theft and buildings from unauthorized entry sometimes include remote signaling devices. The remote signaling device is used to cause the system controller to perform some action, such as unlocking the doors of the vehicle or building. While remote activation is a desirable convenience feature, it introduces certain drawbacks and creates the potential for the security system to be overridden or accessed by an unauthorized user.

A significant drawback introduced by remote signaling in security systems is that a potential thief can intercept a signal from the remote signaling device as it is transmitted to the system controller. In systems where the same signal is repeatedly sent from the transmitter, the potential thief simply captures one transmission of the signal and later imitates that signal with an unauthorized transmitter to gain access to and control over the security system. One attempt at overcoming this problem is to provide a remote signaling transmitter with the ability to alter the signal that is transmitted. Many such systems are not sufficiently secure, however, because a potential thief can intercept a series of transmitted signals and later predict what a subsequent authorized signal will be. Therefore, through successive trial and error, a potential thief can gain unauthorized access to and control over the security system.

Prior to this invention a security system with a remote signaling device that is immune from the type of tampering described above, has not been provided.

SUMMARY OF THE INVENTION

In general terms, this invention is a system and method for controlling a security system that has a remote signaling device, which communicates with a system controller, and incorporates random numbers into the remote signals to ensure the integrity of the system. In one embodiment, the signal transmitted from the remote signaling device is encrypted with a secret key that is made up of a random number. A different random number is used for each signal transmission. The system controller receives the transmitted message and deciphers the random number from command information. The controller then compares the deciphered random number with a listing of acceptable random numbers contained in a control memory module. Once a match is confirmed, the controller takes an appropriate action responsive to the command information in the remote signal.

The various features and advantages of this invention will become apparent to those skilled in the art from the following detailed description of the preferred embodiments. The drawings that accompany the following description can be described as follows.

BRIEF DESCRIPTION OF THE DRAWINGS

FIG. 1 schematically illustrates a system designed according to this invention.

FIG. 2 schematically illustrates a remote signal designed according to one embodiment of this invention.

FIG. 3 is a flow chart diagram illustrating one preferred method associated with this invention.

FIG. 4 is a flow chart diagram illustrating another preferred method associated with this invention.

DETAILED DESCRIPTION OF THE PREFERRED EMBODIMENTS

FIG. 1 schematically illustrates a security system 20. A remote signaling device 22 communicates with a system controller 24. In an embodiment where the security system 20 is used to protect a vehicle, the remote signaling device 22 preferably is a key fob and the controller 24 preferably is mounted on or supported within the vehicle. The remote signaling device 22 includes one or more manually actuatable switches (the illustrated embodiment has two switches 26 and 28), which can be used to control a door lock and trunk lock of a vehicle, respectively, for example. Actuation of either switch 26 or 28 causes the remote signaling device 22 to transmit a remote signal, schematically illustrated at 30, to the controller 24. The remote signal 30 transmitted from the remote signaling device 22 to the controller 24 can be a radio frequency signal, infrared signal or any other desirable short range signal.

The remote signaling device 22 includes a first module 40, a second module 42, a third module 44, and a fourth module 46. The system controller 24 includes a first module 50, a second module 52, a third module 54, a fourth module 56, and a fifth module 58. The various modules schematically illustrated in FIG. 1 are shown for discussion and illustration purposes only. Given this description, it will become apparent to those skilled in the art that the various functions performed by the various modules disclosed in this specification can be accomplished through a single microprocessor, dedicated circuitry and/or custom designed software. Choosing an appropriate implementation of hardware or software to realize the various portions of the system 20 is within the capability of those skilled in the art who have the benefit of this specification.

In one embodiment the remote signaling device 22 includes a first memory module 40 that contains command information, which is used to instruct the controller 24 on what action is to be taken within the system. A second memory module 42 includes a look up table of a plurality of preselected random numbers. The term "random numbers" as used in this specification refers to a series of numbers that have no mathematical or algorithmic correlation. A plurality of random numbers can be generated, for example, by observing radioactive decay or astronomical noise. A significant advantage to using random numbers in a security system designed according to this invention is that random numbers prevent a potential thief from performing any analysis on signals captured from the remote signaling device 22 that would lead to an accurate prediction of a valid subsequent command signal.

The third module 44 of the remote signaling device 22 in this embodiment preferably is an encrypting module that accesses the first and second memory modules. The encrypting module 44 preferably uses a cyclic redundancy code to combine the command information with the random number, which becomes the transmitted signal 30. In this embodiment, the fourth module 44 preferably serves as a counter or position indicator that keeps track of which of the random numbers from the second memory module 42 have been selected and used in generating a remote signal. In the most preferred embodiment, the second memory module 42 is a one-time pad provided with enough random numbers so that each number is used in only one transmitted signal.

Providing enough random numbers so that each one is used only once, depends on available resources in technology and cost. Assuming a 10-year system lifetime with 10 transmissions per day and 29 bits per transmitted signal, the second memory portion 42 would require 132,403 bytes. Even though commercially available flash memory chips have such capacity, memory of this size may be too large to implement in some remote signaling devices 22.

In one example, 577 random numbers preferably are provided assuming the same number of transmissions per day and the same signal size. This reduces the required memory capacity down to 2,092 bytes. In this example, each random number is used approximately once per month in a cyclical fashion. With such an embodiment, a potential thief would need to capture and monitor several transmitted signals, perform a cryptographic analysis and then wait approximately one month before potentially being able to obtain unauthorized access to the system 20. As can be seen, there is a generally linear relationship between the size of the memory module containing the random numbers, the cost of the system, and the level of security that will be provided. A designer of a system according to this invention can choose what considerations are most important in a given implementation.

The controller 24 also includes a memory module 50 that has the same plurality of preselected random numbers. A decrypting module 52 deciphers the remote signal that is received by the controller 24. In situations where command information is transmitted with a random number, the decrypting module 52 separates the command information from the random number. The decrypting module 52 preferably unscrambles the transmission by performing a reverse cyclic redundancy code operation. A comparator module 54 then compares the received random number with the plurality of random numbers in the control memory module 50. Once a match is determined, the activation module 58 causes an appropriate action within the system 20 that is responsive to the command information contained within the transmitted signal. The fourth module 56 in this embodiment preferably serves as a counter or position indicator that keeps track of which of the random numbers from the control memory module 50 have been matched.

The counter or position indicator modules 46 and 56 provide the system with the ability to expect what the next transmitted random number will be. The preferred embodiment further includes a "look-ahead" capability to compensate for situations where the remote signaling device 22 is inadvertently activated out of range of the controller 24. When a random number within a transmitted signal does not match the next expected random number in the memory module 50, the controller 24 "looks ahead" through subsequent random numbers, within a preselected range, to try and find a match. If no match is achieved, then the controller 24 preferably performs a conventional error correction technique or simply assume that an inappropriate signal 30 has been transmitted and received.

FIG. 2 schematically illustrates the contents of a transmitted message 60 from this embodiment. A first portion 62 of the signal 30 includes the encrypted data, which comprises the random number. In some cases, separate command information may be appended to the random number. A second portion 64 contains information corresponding to the position of the random number within the appropriate memory module. A third portion 66 includes a parity or error correction field, which facilitates detecting whether the transmitted signal is of an appropriate form.

In another embodiment, the various modules of the remote signaling device 22 and the controller 24 perform different functions compared to those described above. In this embodiment, the first module 40 contains command information associated with each of the switches 26 and 28, for example. The second module 42 preferably comprises a random number generator. The random number generator 42 will randomly generate a number from within a preselected range of numbers each time that one of the switches 26 or 28 is actuated. The third module 44 is a modifying module that modifies the signal, which includes the command information. The modifying module can utilize a non-linear algorithm, for example, to manipulate the signal in a predictable fashion. The fourth module 46, serves as a counter that monitors the number of modifications performed by the modifying module 44.

In this embodiment, each time that a switch is actuated, the random number generator 42 generates a number within a preselected range; between 1 and 64, for example. The most recently transmitted signal, which preferably is stored in memory in the first module 40, is then modified within the modifying module 44 a number of times corresponding to the random number that was just generated. This procedure is schematically illustrated in the flow chart 80 of FIG. 3. First, a random number r is generated at 82. The most recently transmitted signal is determined at 84. The modifying algorithm is then applied to that signal r times. This results in a new signal that is transmitted at 88.

The controller 24 in this embodiment includes the ability to calculate a series of expected signals within a preselected range or sync window. In one example, the controller 24 calculates the next 256 expected signals and compares them with the signal received from the remote signaling device 22. If the received signal 30 matches any of the next 256 expected signals generated within the controller 24, then the message within the signal is accepted and the system is appropriately activated. In the preferred embodiment, the range of available random numbers generated within the remote signaling device 22 is far less than the size of the sync window of the controller 24 to ensure that the generated signal falls within the sync window.

In another embodiment, the remote signaling device 22 includes a memory module that is a one-time-pad containing a plurality of random numbers. In the most preferred embodiment, enough random numbers are provided so that throughout the lifetime of the system 20 each number is used only once. The controller 24 is provided with the same list of random numbers. When either switch 26 or 28 is actuated, data (i.e., a random number) from specific locations in the remote signaling device memory module will be transmitted. The specific locations preferably are stored in pointers corresponding to each switch or command. A pointer corresponding to the most recently activated switch is thereafter adjusted to a next location so that no random number is reused for the anticipated life of the system. Whenever controller 24 receives data that matches data within the control memory module 50, then the implicit command indicated by the memory location of the random number is authenticated and an appropriate action is performed by the controller 24.

It is possible to have separate memory modules for each of the functions associated with the switches 26 and 28. In the preferred embodiment, however, only one memory module is used for all of the random numbers.

Alternatively, no pointers are necessary when another method is implemented to indicate that a random number has been used. For example, an additional "used" bit may be appended to each memory location. Another, more preferred, alternative is to zero out a random number once it is used.

FIG. 4 illustrates, in flow diagram form, a method 90 of using the latter embodiment. The random number at a current pointer location is transmitted at 92. After the transmission the pointer in the remote signaling device 22 is relocated at 94. The controller 24 receives the signal at 96 and determines whether the transmitted random number matches any of the numbers in the control memory module at 98. If a match has been found, the pointer in the control memory module is then relocated so that it corresponds to the relocated pointer position in the remote signaling device 22.

Since the two memory modules have the same preselected random numbers in the same order, upon receipt of a signal, the receiver 24 "expects" the received random number to be in the current location of the pointer within the controller 24. To compensate for situations where the remote signaling device 22 is inadvertently actuated outside the range of the controller 24, the controller 24 includes a "look-ahead" feature as described above. The controller 24 will examine the random numbers within the control memory module at subsequent locations to the current pointer position within a preselected range until a match is found or, when the preselected range is exceeded, a determination is made that the received signal is not acceptable and no further action is taken.

The foregoing description is exemplary rather than limiting in nature. Variations and modifications to the disclosed embodiments may become apparent to those skilled in the art that do not necessarily depart from the purview and spirit of this invention. For example, minor modifications may be implemented to make a security system designed according to this invention better suited for a vehicle or a building security system. Accordingly, the following claims must be studied to determine the scope of legal protection afforded this invention.

What is claimed is:

1. A security system, comprising
   a remote signalling device including
      a transmitter portion,
      a switch that is actuatable to selectively activate said transmitter portion to transmit a remote signal from said signalling device,
      a remote memory module having a plurality of preselected random numbers that have no mathematical or algorithmic correlation,
      a message module that chooses one of said random numbers as said remote signal;
   a controller having a receiver portion that receives said remote signal from said signalling device, said controller including
      a control memory module having a plurality of preselected random numbers that have no mathematical or algorithmic correlation,
      a control module that receives said chosen random number from said received remote signal,
      a comparator module that compares said received random number with said plurality of random numbers in said control memory module; and
      an activation module that activates an appropriate portion of said security system responsive to said comparator module when said received chosen random number matches one of said plurality of random numbers in said control memory module.

2. The system of claim 1, wherein said remote memory module comprises a one-time-pad and each said random number is chosen by said message module only once.

3. The system of claim 2, wherein said plurality of random numbers are arranged in said remote memory module in a preselected order and said plurality of random numbers are arranged in said preselected order within said control memory module and wherein said remote signaling device also includes a remote tracker module that tracks previously chosen random numbers, and said controller also includes a control tracker module that tracks previously received chosen random numbers.

4. The system of claim 3, wherein said remote memory module is alterable and said remote tracker module alters said remote memory module to perform said tracking.

5. The system of claim 3, wherein said control memory module is alterable and said control tracker module alters said control memory module to perform said tracking.

6. The system of claim 3, wherein said remote tracker module tracks the position of a most recently chosen random number and wherein said message module combines said chosen random number with said position; said control module receives and separates said chosen random number and said position information; and said control tracker module tracks the position of a most recently received chosen random number and said comparator module is responsive to said received chosen random number and said received position information.

7. The system of claim 1, wherein said plurality of random numbers in said remote memory module are each chosen once before any of said plurality of random numbers are chosen again.

8. The system of claim 7, wherein said plurality of random numbers are arranged in said remote memory module in a preselected order and said plurality of random numbers are arranged within said control memory module in said preselected order and wherein said remote signaling device also includes a remote tracker module that tracks the positions of previously chosen random numbers, and said controller also includes a control tracker module that tracks the positions of previously received chosen random numbers.

9. The system of claim 8, wherein said remote tracker module tracks the position of a most recently chosen random number and wherein said message module combines said chosen random number with said position; and said control module receives and separates said chosen random number and said position information; and said control tracker module tracks the position of a most recently received chosen random number and said comparator module is responsive to both said received chosen random number and said received position information.

10. The system of claim 1, wherein said message module combines said chosen random number with command information corresponding to said switch as said remote signal; said control module receives and separates said chosen random number and said command information; and said activation module is responsive to said comparator module and said received command information.

11. The system of claim 10, wherein said message module combines said chosen random number and said command information with memory position information of said chosen random number in said remote memory module as said remote signal; said control module receives and separates said chosen random number and said command information and said memory position information; and said comparator module is responsive to said received chosen random number and said received memory position information.

12. The system of claim 1, wherein said controller controls a plurality of functions of said security system and said remote signaling device includes a plurality of switches to uniquely identify one of said plurality of functions.

13. The system of claim 1, wherein said remote signaling device further includes an error correcting encoder and said controller further includes an error correcting decoder, wherein said error correcting encoder modifies said remote signal, said controller receives said modified remote signal and said error correcting decoder reverses the modification of said received modified remote signal to thereby remove any transmission errors from said received remote signal.

14. A method of controlling a security system having a remote signalling device and a system controller that receives signals from the remote signalling device, comprising the steps of:

(A) determining a most recently transmitted signal that was sent from the remote signalling device to the controller;

(B) generating a random number from within a preselected range of eligible numbers;

(C) modifying the most recently transmitted signal from step (A) by applying a preselected modifying algorithm to the most recently transmitted signal a number of times equal to the random number generated in step (B); and (D) transmitting the modified signal from step (C) from the remote signalling device to the controller.

15. The method of claim 14, wherein the random number from step (B) has a value=r and wherein step (C) is performed by substeps of (1) applying the preselected modifying algorithm to the most recently transmitted signal to thereby generate an altered signal;

(2) modifying the altered signal by applying the preselected modifying algorithm to the altered signal; and (3) reperforming substep (2) a number of times=(r−2).

16. The method of claim 14, further comprising the steps of (E) receiving the modified signal at the controller;

(F) determining whether the modified signal is an acceptable signal; and (G) instigating an action consistent with the modified signal when the modified signal is an acceptable signal.

17. The method of claim 16, wherein step (F) is performed by applying the preselected modifying algorithm to the most recently transmitted signal of step (A) a number of times within a preselected range to thereby generate a potentially matching signal until the modified signal and the potentially matching signal are identical.

18. A security system, comprising:

a remote signaling device;

a system controller that receives signals from the remote signaling device; and wherein said remote signaling device includes means for determining a most recently transmitted signal that was sent from the remote signaling device to the controller, means for generating a random number from within a preselected range of eligible numbers, means for modifying the most recently transmitted signal by applying a preselected modifying algorithm to the most recently transmitted signal a number of times equal to the random number generated by the generating means.

* * * * *